United States Patent
Witham et al.

(10) Patent No.: US 7,300,589 B2
(45) Date of Patent: *Nov. 27, 2007

(54) PROCESS FOR REMOVING ARSENIC FROM AQUEOUS STREAMS

(75) Inventors: Richard Donald Witham, Las Vegas, NV (US); Edward Bayer McNew, Las Vegas, NV (US); John Leslie Burba, III, Boulder City, NV (US)

(73) Assignee: Union Oil Company of California, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/435,697

(22) Filed: May 16, 2006

(65) Prior Publication Data

US 2006/0207945 A1 Sep. 21, 2006

Related U.S. Application Data

(62) Division of application No. 11/029,257, filed on Jan. 5, 2005, now Pat. No. 7,048,853, which is a division of application No. 10/353,705, filed on Jan. 29, 2003, now Pat. No. 6,863,825.

(51) Int. Cl.
*C02F 1/58* (2006.01)

(52) U.S. Cl. ............ 210/714; 210/665; 210/667; 210/668; 210/683; 210/721; 210/911; 423/87

(58) Field of Classification Search ........... 210/721
See application file for complete search history.

(56) References Cited

U.S. PATENT DOCUMENTS

| | | | |
|---|---|---|---|
| 3,916,585 A | 11/1975 | Barks | |
| 4,001,375 A | 1/1977 | Longo | |
| 4,046,687 A | 9/1977 | Schulze | |
| 4,346,063 A | 8/1982 | Cahn et al. | |
| 4,596,659 A | 6/1986 | Nomura et al. | |
| 5,043,072 A | 8/1991 | Hitotsuyanagi et al. | |
| 5,053,139 A | 10/1991 | Dodwell et al. | |
| 5,603,838 A | 2/1997 | Misra et al. | |
| 6,197,201 B1 | 3/2001 | Misra et al. | |
| 6,221,118 B1 | 4/2001 | Yishida et al. | |
| 6,368,510 B2 | 4/2002 | Friot | |
| 6,383,395 B1 | 5/2002 | Clarke et al. | |
| 6,395,659 B2 | 5/2002 | Seto et al. | |
| 6,613,230 B2 | 9/2003 | Krulik et al. | |
| 6,800,204 B2 | 10/2004 | Harck et al. | |
| 6,863,825 B2 | 3/2005 | Witham et al. | |
| 2002/0003116 A1 | 1/2002 | Golden | |
| 2003/0155303 A1 | 8/2003 | Harck et al. | |

OTHER PUBLICATIONS

Ahmed, M. Feroze, "An Overview of Arsenic Removal Technologies in Bangladesh and India," Buet-Unu International Workshop on Technologies for Arsenic Removal from Drinking Water, May 5-7, 2001, pp. 251-269.

"UI Arsenic Water Treatment Project Shows Promise," Environmental News Network—ENN Direct, Dec. 3, 2002, pp. 1-2.

"Clear Choices for Clean Drinking Water," *Consumer Reports*, Jan. 2003, pp. 33-37.

Zhang, Yu, Yang, Min, Huang, Xia, "Arsenic(V) Removal With A Ce(IV)-Doped Iron Oxide Adsorbent," *Chemosphere*, vol. 51, No. 9, Jun. 2003, pp. 945-952.

*Primary Examiner*—Peter A. Hruskoci
(74) *Attorney, Agent, or Firm*—Yale S. Finkle; Frank C. Turner

(57) ABSTRACT

Arsenic is removed from water and other aqueous feeds by (1) treating the feed with a compound containing cerium in the +4 oxidation state, preferably cerium dioxide, to oxidize arsenic in the +3 oxidation state to arsenic in the +5 oxidation state and (2) removing the arsenic in the +5 oxidation state from the aqueous phase, normally by contacting the treated feed with alumina or other precipitating agent containing cations in the +3 oxidation state.

4 Claims, No Drawings

PROCESS FOR REMOVING ARSENIC FROM AQUEOUS STREAMS

CROSS REFERENCE TO RELATED APPLICATIONS

This application is a divisional application of U.S. patent application Ser. No. 11/029,257, filed in the United States patent and Trademark Office on Jan. 5, 2005, now U.S. Pat. No. 7,048,853, which was a divisional application of U.S. patent application Ser. No. 10/353,705, filed in the United States Patent and Trademark Office on Jan. 29, 2003, now U.S. Pat. No. 6,863,825.

BACKGROUND OF INVENTION

This invention relates generally to methods, compositions and devices for removing arsenic from aqueous streams and is particularly concerned with methods, compositions and devices for removing arsenic from groundwater and drinking water using cerium in the +4 oxidation state to oxidize arsenic so it can be precipitated from the water.

Arsenic is a toxic element that naturally occurs in a variety of combined forms in the earth. Its presence in natural waters may originate, for example, from geochemical reactions, industrial waste discharges and past agricultural uses of arsenic-containing pesticides. Because the presence of high levels of arsenic may have carcinogenic and other deleterious effects on living organisms, the U.S. Environmental Protection Agency (EPA) and the World Health Organization have set the maximum contaminant level (MCL) for arsenic in drinking water at 10 parts per billion (ppb). Arsenic concentrations in wastewaters, groundwaters, surface waters and geothermal waters frequently exceed this level. Thus, the current MCL and any future decreases, which may be to as low as 2.0 ppb, create the need for new techniques to economically and effectively remove arsenic from drinking water, well water and industrial waters.

Arsenic occurs in four oxidation or valence states, i.e., −3, 0, +3, and +5. Under normal conditions arsenic is found dissolved in aqueous or aquatic systems in the +3 and +5 oxidation states, usually in the form of arsenite ($AsO_2^{-1}$) and arsenate ($AsO_4^{-3}$). The effective removal of arsenic by coagulation techniques requires the arsenic to be in the arsenate form. Arsenite, in which the arsenic exists in the +3 oxidation state, is only partially removed by adsorption and coagulation techniques because its main form, arsenious acid ($HAsO_2$), is a weak acid and remains un-ionized at a pH between 5 and 8 where adsorption takes place most effectively.

Various technologies have been used in the past to remove arsenic from aqueous systems. Examples of such techniques include adsorption on high surface area materials, such as alumina and activated carbon, ion exchange with anion exchange resins, co-precipitation and electrodialysis. However, most technologies for arsenic removal are hindered by the difficulty of removing arsenite. The more successful techniques that have been used in large municipal water supplies are not practical for residential applications because of space requirements and the need to use dangerous chemicals. The two most common techniques for residential water treatment have been reverse osmosis and activated alumina. The former method produces arsenic-containing waste streams that must be disposed of, and the latter requires the use of caustic chemicals.

The above facts coupled with the potential for the decrease in MCL to between 2 and 10 ppb make it imperative that effective processes, compositions and devices for removing arsenic from water and other aqueous systems be developed.

SUMMARY OF THE INVENTION

In accordance with the invention, it has now been found that arsenic can be efficiently and effectively removed from water and other aqueous feedstocks by treating the arsenic-containing aqueous feed with a compound containing cerium in the +4 oxidation state, preferably cerium dioxide ($CeO_2$), in order to oxidize the arsenic so that it can be more easily removed by precipitation from the treated aqueous feed to produce a purified aqueous liquid with a reduced concentration of arsenic. "Precipitation" as used herein encompasses not only the removal of arsenic-containing ions in the form of insoluble species, but also includes the immobilization of arsenic-containing ions on or in insoluble particles. In one embodiment of the process of the invention, water or other aqueous liquid containing dissolved arsenic in the +3 and +5 oxidation states is contacted with cerium dioxide to oxidize arsenic in the +3 oxidation state to arsenic in the +5 oxidation state, and the arsenic in the +5 oxidation state is removed from the aqueous liquid by contacting the liquid with a precipitating agent that reacts with the arsenic in the +5 oxidation state to produce insoluble arsenic compounds and an aqueous liquid of reduced arsenic content.

Typically, the oxidized arsenic is in the +5 oxidation state and dissolved in the water or other aqueous liquid in the form of arsenate ($AsO_4^{-3}$). The precipitating agent used to remove the oxidized arsenic from the aqueous liquid can be anything that reacts with the arsenate or other form of oxidized arsenic to produce insoluble arsenic compounds. For example, the precipitating agent can be cerium in the +3 oxidation state produced in the arsenic oxidation step when cerium in the +4 oxidation state is reduced. Alternatively, the precipitating agent can be any particulate solid containing cations in the +3 oxidation state, such as alumina, aluminosilicates, ion exchange resin and clays.

The oxidation and precipitation steps can be carried out in the same or separate zones. If the steps are carried out in the same zone, the compound containing cerium in the +4 oxidation state is usually mixed with the precipitating agent. Although this mixture can be made by supporting the cerium compound on the surface and/or in the pores of the precipitating solids, it is usually preferred that the cerium compound in particulate form be physically mixed with particles of the precipitating agent. A preferred composition of the invention comprises a mixture of cerium dioxide and alumina.

In a preferred embodiment of the process of the invention, an aqueous liquid containing dissolved arsenic in the form of arsenate and arsenite is contacted with a mixture of cerium dioxide particulates and alumina particulates in an oxidation zone such that the cerium dioxide oxidizes the arsenite to arsenate and the alumina reacts with the arsenate to form insoluble aluminum arsenate that sorbs onto the particles of alumina. The aqueous liquid exiting the oxidation zone contains a substantially reduced concentration of arsenic, usually less than about 2.0 ppb.

DETAILED DESCRIPTION OF THE INVENTION

Although the process of the invention is primarily envisioned for removing dissolved arsenic from drinking water and groundwater, it will be understood that the process can be used to treat any aqueous liquid feed that contains undesirable amounts of arsenic. Examples of such liquid feeds include, among others, well water, surface waters, such as water from lakes, ponds and wetlands, agricultural waters, wastewater from industrial processes, and geothermal fluids. The arsenic-containing feed can also contain other inorganic contaminants, such as selenium, cadmium, lead and mercury, and certain organic contaminants. Generally, the process of the invention can be used to treat any aqueous liquid feedstock containing more than 2.0 ppb arsenic and is effective for treating feeds containing more than 500 ppb arsenic. The process is effective in decreasing the arsenic levels in such feeds to below 5.0 ppb, usually to below 2.0 ppb.

The arsenic contaminating the aqueous feed is normally dissolved in the aqueous phase and usually exists in both the +3 and +5 oxidation states, respectively, as arsenite ($AsO_2^{-1}$) and arsenate ($AsO_4^{-3}$). Techniques for removing arsenate exist and are quite effective, but removing the arsenite is a more difficult proposition because the present technologies for doing so are not greatly effective. It has now been found that substantially all of the dissolved arsenite can be easily oxidized to arsenate by treating the aqueous feed with cerium in the +4 oxidation state and the resulting arsenate, along with the arsenate originally present in the aqueous feed, precipitated from the treated feed to produce an arsenic-depleted aqueous liquid.

In the process of the invention, the aqueous feed contaminated with arsenic is passed through an inlet into an oxidation vessel at a temperature and pressure, usually ambient conditions, such that the water in the feed remains in the liquid state. If the feed is contaminated with particulate solids, it is usually treated to remove the solids before it is passed into the oxidation vessel. Any liquid-solids separation technique, such as filtration, centrifuging and hydrocycloning, can be used to remove the particulate solids.

In the oxidation vessel the aqueous feed is contacted with a compound containing cerium in the +4 oxidation state (hereinafter referred to as cerium +4), which Ce +4 is an extremely strong oxidizing agent and oxidizes any arsenite or other arsenic present in the +3 oxidation state to arsenate or other species containing arsenic in the +5 oxidation state. All of the arsenic species containing arsenic in the +5 oxidation state is then precipitated from the aqueous phase by contacting the oxidized aqueous feed with a precipitating agent.

The oxidizing agent can be any solid or liquid containing cerium in the +4 oxidation state. Although it is generally preferred to use solid particles of cerium dioxide, which are insoluble in water and relatively attrition resistant as the oxidizing agent, water-soluble cerium compounds can also be used. Examples of such compounds include ceric ammonium nitrate, ceric ammonium sulfate, ceric sulfate, and ceric nitrate.

The precipitating agent that reacts with the arsenate containing arsenic in the +5 oxidation state to form insoluble arsenic compounds can be present in the oxidation vessel with the cerium +4 compound so that the precipitation occurs essentially simultaneously with the oxidation. Alternatively, it can be in a separate vessel into which the treated liquid exiting the oxidation vessel passes. For simplicity purposes, it is normally preferred for both the cerium compound and precipitating agent to be present in the oxidation vessel. This embodiment of the invention eliminates the need for an extra vessel and thereby reduces the cost of installing and operating the process of the invention.

Although the precipitating agent can be any material, solid or liquid, that reacts with arsenate or other species containing arsenic in the +5 oxidation state to form insoluble arsenic compounds, it is usually a particulate solid that contains cations in the +3 oxidation state, which cations react with arsenate to form insoluble arsenate compounds. Examples of such solids containing cations in the +3 oxidation state include alumina, gamma-alumina, activated alumina, acidified alumina such as alumina treated with hydrochloric acid, metal oxides containing labile anions such as aluminum oxychloride, crystalline alumino-silicates such as zeolites, amorphous silica-alumina, ion exchange resins, clays such as montmorillonite, ferric sulfate, porous ceramics, and cerium compounds containing cerium in the +3 oxidation state, such as cerous carbonate. Although lanthanum oxide and other rare earth compounds can be used as the precipitating agent, these materials are typically not employed (except of course for cerium compounds) in the process of the invention because it is preferred to use a precipitating agent that has a much smaller Ksp than that of the rare earth compounds.

As mentioned above it is normally preferable that the cerium +4 compound and precipitating agent both be present in the oxidation vessel so that the arsenic is oxidized and precipitated essentially simultaneously in the same vessel. Although the cerium +4 compound and precipitating agent can both be water-soluble, it is normally preferred that the cerium +4 compound and precipitating agent both be water-insoluble particulate solids that are either slurried with the aqueous feed in the oxidation vessel or physically mixed together in a fixed bed through which the aqueous feed is passed during the oxidation step. In an alternative embodiment of the invention, the cerium +4 compound can be deposited on the surface and/or in the pores of the solid precipitating agent. This embodiment is normally not preferred over a physical mixture because supporting the cerium compound on or in the precipitating solids requires the cerium compound to be dissolved in a liquid, the resultant solution mixed with the support solids, and the wet solids dried. Such steps add significantly to the cost of practicing the process of the invention.

Normally, a sufficient amount of the cerium +4 compound is present in the oxidation vessel with the particulate precipitating agent so that the mixture of the two contains between about 8 and 60 weight percent of the cerium +4 compound calculated as the oxide. Preferably, the mixture will contain between about 10 and 50 weight percent, more preferably between about 20 and 30 weight percent, of the cerium +4 compound calculated as the oxide. However, in some instances, it may be desirable for the mixture to contain greater than 40 to 45 weight percent of the cerium +4 compound calculated as the oxide.

Regardless of whether the cerium +4 compound is present in the oxidation vessel in admixture with the particulate precipitating agent or supported on or in the pores of the precipitating agent, the solids will typically range in diameter between about 0.25 and 1.5, preferably from 0.5 to 1.0, millimeters. When the cerium +4 compound and precipitating agent are present in the oxidation zone as a fixed bed, it is normally preferred that the particles be spherical in shape so the flow of the aqueous feed through the bed is evenly distributed. However, if desired, the particles may take other shapes including that of extrudates. Such extrudates would typically have a length between about 0.2 and about 3.0 millimeters.

During the oxidation step of the process of the invention, arsenite in the aqueous feed is oxidized to arsenate according to the following equation:

$$Ce^{+4} + AsO_2^{-1} \rightarrow Ce^{+3} + AsO_4^{-3}$$

As the cerium +4 oxidizes the arsenite, it is reduced to cerium in the +3 oxidation state, which then reacts with the arsenate formed during the oxidation step to produce insoluble cerium arsenate as shown in the following equation:

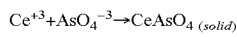

Although theoretically there is enough cerium +3 formed by reduction of cerium +4 to react with all of the arsenate formed in the oxidation reaction to precipitate the arsenate, it is normally preferred that an additional precipitating agent be present. This agent, which can be a compound containing cerium +3, reacts with any unreacted arsenate to form an insoluble precipitate, which is removed from the aqueous feed to produce the desired arsenic-depleted aqueous liquid.

The oxidation step that takes place in the oxidation vessel is normally carried out at ambient pressure, at a temperature from about 4° to 100° C., preferably from about 5° to 40° C., and at a pH greater than about 3.0. The residence time of the aqueous feed in the oxidation vessel typically ranges from about 2.0 to about 30 minutes. When the cerium +4 compound and arsenic precipitant are both solid particulates and present together as a fixed bed in the oxidation vessel, the precipitated arsenic compounds will be sorbed by or otherwise associated with the solid particles of the precipitating agent so that the aqueous fluid exiting the oxidation vessel will contain essentially no solids and very little arsenic, usually less than about 10 ppb and quite frequently less than 2.0 ppb. If the precipitating agent is not in the oxidation vessel, the effluent from the vessel is passed to another vessel where it is treated separately with the arsenic precipitating agent. Finally, if the cerium +4 compound and precipitating agent are particulate solids that are slurried with the aqueous feed in the oxidation vessel, the effluent from the vessel is normally treated to separate the solids, including the insoluble arsenic compounds formed in the vessel, from the arsenic-depleted liquid. Although the separation can be carried out in any type of device capable of removing particulates from liquids, a filtration system is typically employed.

If the aqueous feed to the process of the invention contains other contaminants that must be removed in addition to arsenic to produce the desired purified aqueous product, the removal of these contaminants is typically carried either before or after the oxidation step. If the other contaminants will interfere with the oxidation of the arsenic, they should be removed prior to the oxidation step. In some cases the process of the invention is also effective for removing other contaminants from the aqueous feed in addition to or to the exclusion of arsenic.

In a preferred embodiment of the invention, an arsenic purifying device containing a cartridge or filter is used to treat residential drinking water. The treating device can be a free standing container with a filtering device containing the composition of the invention or a cartridge type device designed to fit under a sink. These devices are situated so that the water entering the home or business location passes through the filter or cartridge before it enters the sink faucet. The filter and cartridge devices are quite simple and comprise a inlet attached to the source of the drinking water, a filter or cartridge containing the cerium +4 oxidizing agent, usually in the form of a fixed bed and in admixture with an arsenic precipitant, and an outlet in communication with the sink faucet to direct the arsenic-depleted drinking water exiting the cartridge or filter to the entrance of the faucet. Alternatively, a cartridge or filter type device can be designed to fit onto the faucet so that water exiting the faucet passes through the cartridge or filter device before it is consumed.

In the filter or cartridge, arsenic in the +3 oxidation state is oxidized to arsenic in the +5 oxidation state, and substantially all of the dissolved arsenic +5 present reacts with cerium in the +3 oxidation state and the arsenic precipitating agent to form insoluble arsenic compounds that are sorbed onto the fixed bed solids. The precipitating agent is preferably alumina or an ion exchange resin. The effluent exiting the fixed bed and the outlet of the cartridge or filter device will typically have an arsenic concentration less than about 2.0 ppb. After the fixed bed in one of the cartridge or filter devices becomes saturated with arsenic, the cartridge or filter is replaced with a new cartridge or filter of the same or similar design. The spent cartridge or filter is then disposed of in a legally approved manner.

In another embodiment, the process of the invention is used in community water treatment facilities to remove arsenic from drinking water before the water is distributed to local homes and businesses. For such use the cerium +4 oxidizing agent is typically present in large tanks in either slurry form or in a fixed bed so that relatively large amounts of arsenic-containing water can be treated either in a continuous or batch mode. The arsenic precipitant can be present either in the tank with the cerium +4 oxidizing agent or in a separate vessel fed by the effluent from the tank. The water exiting the process typically has an arsenic concentration less than about 10 ppb, usually less than 5.0 ppb, and preferably less than 2.0 ppb.

The nature and objects of the invention are further illustrated by the following example, which is provided for illustrative purposes only and not to limit the invention as defined by the claims. The example shows that arsenic in the +3 and +5 oxidation state can be completely removed from water using cerium dioxide.

EXAMPLE

Test solutions were prepared to mimic arsenic-containing groundwater by mixing certified standard solutions of arsenic in the +3 and +5 oxidation states with tap water containing no arsenic. Twenty grams of lanthanum oxide ($La_2O_3$), 20 grams of cerium dioxide ($CeO_2$), and a mixture of 10 grams of lanthanum oxide and 10 grams of cerium dioxide were separately placed in a sealed 100 milliliter glass container and slurried with about 96 milliliters of test solutions containing 100 ppb of arsenic +3, 100 ppb of arsenic +5, and 50 ppb of both arsenic +3 and arsenic +5. The resultant slurries were agitated with a Teflon coated magnetic stir bar for 15 minutes. After agitation, the tap water was separated from the solids by filtration through Whatman #41 filter paper and sealed in 125 milliliter plastic sample bottles. The bottles were then sent to a certified drinking water analysis laboratory where the amount of arsenic in each sample was determined by graphite furnace atomic absorption spectroscopy. The results of these tests are set forth below in Table 1.

TABLE 1

| Test No. | Arsenic in Water Before Test | | Slurried Material percent | Arsenic in Water After Test ppb | Arsenic Removed percent |
|---|---|---|---|---|---|
| | ppb $As^{+3}$ | ppb $As^{+5}$ | | | |
| 1 | 0 | 0 | 0 | 0 | NA |
| 2 | 50 | 50 | 0 | 100 | 0 |
| 3 | 50 | 50 | 100% $La_2O_3$ | 45 | 55 |
| 4 | 50 | 50 | 100% $CeO_2$ | 0 | 100 |

TABLE 1-continued

| Test No. | Arsenic in Water Before Test | | Slurried Material percent | Arsenic in Water After Test ppb | Arsenic Removed percent |
|---|---|---|---|---|---|
| | ppb $As^{+3}$ | ppb $As^{+5}$ | | | |
| 5 | 50 | 50 | 50% $La_2O_3$ 50% $CeO_2$ | 0 | 100 |
| 6 | 100 | 0 | 50% $La_2O_3$ 50% $CeO_2$ | 0 | 100 |
| 7 | 0 | 100 | 50% $La_2O_3$ 50% $CeO_2$ | 0 | 100 |
| 8 | 0 | 0 | 50% $La_2O_3$ 50% $CeO_2$ | 0 | NA |

The data for test 3 in the table show that, when lanthanum oxide is used by itself, only 55 percent of the arsenic present in the arsenic-spiked tap water is removed. Since the solubility of lanthanum arsenate, which contains arsenic +5, is very small, it was assumed that the arsenic remaining in solution was primarily arsenic +3 in the form of arsenite. The results of test 4, on the other hand, show that cerium dioxide can remove all of the arsenic from the water. The disparity in these results is attributed to the fact that cerium exists in the +4 oxidation state in cerium dioxide and is a strong oxidizing agent, whereas the lanthanum in the lanthanum oxide, which is in the +3 oxidation state, is not an oxidizing agent. Although the lanthanum +3 reacts with arsenic in the +5 oxidation state to precipitate it from the water, the lanthanum does not react with the arsenic in the +3 oxidation state. The cerium in the cerium dioxide oxidizes the arsenic +3 to arsenic +5, which then reacts with cerium +3 formed by the reduction of cerium +4 to precipitate all of the arsenic dissolved in the water. Tests 5-7 show that equal mixtures of cerium dioxide and lanthanum oxide are also effective in removing all of the arsenic from the tap water.

Although this invention has been described by reference to several embodiments of the invention, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

We claim:

1. A method for removing arsenic from an aqueous feed which comprises contacting said aqueous feed with solids consisting essentially of a compound containing cerium in the +4 oxidation state to oxidize and remove said arsenic from said feed and thereby produce an aqueous fluid having a reduced arsenic concentration as compared to said aqueous feed, wherein said cerium reacts with said arsenic to form an insoluble cerium arsenate precipitate.

2. The method defined by claim 1 wherein said solids consist essentially of cerium dioxide.

3. A method for removing arsenic from an aqueous feed which comprises contacting said aqueous feed with a compound containing cerium in the +4 oxidation state supported on a solid consisting essentially of particles selected from the group consisting of alumina, crystalline aluminosilicates, clays and porous ceramics to oxidize and remove said arsenic from said feed and thereby produce an aqueous fluid having a reduced arsenic concentration as compared to said aqueous feed, wherein said cerium reacts with said arsenic to form an insoluble cerium arsenate precipitate.

4. The method defined by claim 3 wherein said compound containing cerium in the +4 oxidation state comprises cerium dioxide.

* * * * *